United States Patent

[11] 3,581,433

| [72] | Inventors | Burton C. Meyer; |
| | | Marvin I. Glass, both of Chicago, Ill. |
| [21] | Appl. No. | 10,250 |
| [22] | Filed | Feb. 10, 1970 |
| [45] | Patented | June 1, 1971 |
| [73] | Assignee | Marvin Glass & Associates |

[54] WRITING DOLL
15 Claims, 5 Drawing Figs.

[52] U.S. Cl. .................................................... 46/116
[51] Int. Cl. ............................................... A63h 13/00
[50] Field of Search .......................................... 46/115,
   116, 117, 118, 119, 120; 33/23, 18, 25, 27; 35/26, 36, 37

[56] References Cited
UNITED STATES PATENTS
3,119,184  1/1964  Prosanski ..................... 33/25
3,160,956  12/1964  Mercorelli ..................... 33/25

*Primary Examiner*—Louis G. Mancene
*Assistant Examiner*—D. L. Weinhold
*Attorney*—Hofgren, Wegner, Allen, Stellman & McCord ABSTRACT: A tracing device which includes a tracing element mounted on a base or structure for free movement to trace characters on a workpiece, and an image forming member movable in response to movement of the tracing element to reproduce an image of the traced characters onto a blank. A doll is positioned adjacent the blank with an arm of the doll positionable over the blank, the arm being journaled on the doll's body so that the end or hand portion of the arm is freely movable over the blank and is connected to the image forming member to give the effect that the doll is duplicating the character traced by manipulation of the tracing element. The doll's body and the doll's head is connected by linkage to the doll's arm to cause relative movement of the doll's body and/or the doll's head in response to movement of the doll's arm over the blank.

INVENTORS
BURTON C. MEYER
MARVIN I. GLASS

BY Hofgren, Wegner, Allen, Stellman & McCord
ATTORNEYS

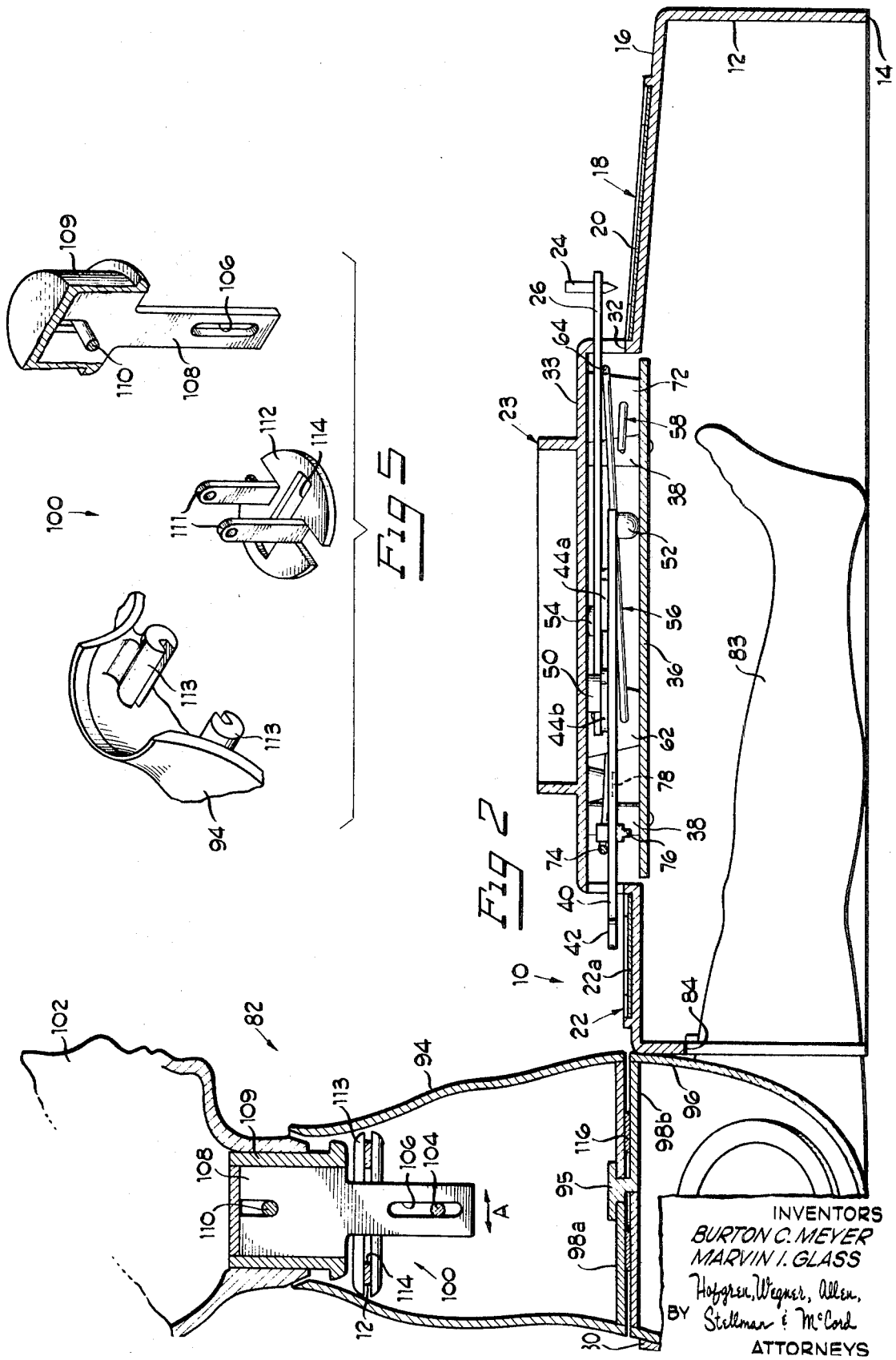

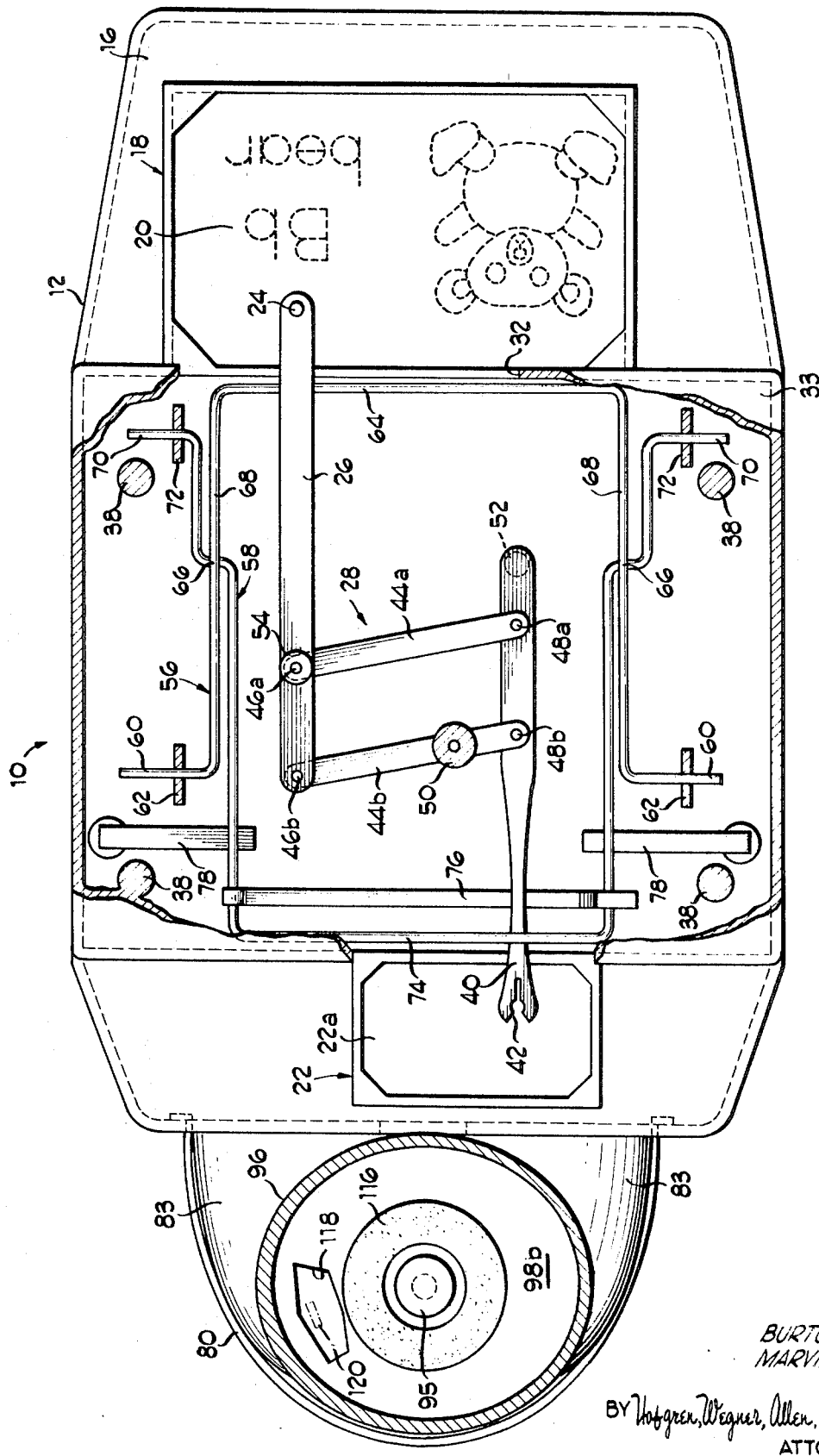

WRITING DOLL

BACKGROUND AND SUMMARY OF THE INVENTION

One of the first and most important tools used by educators in developing hand and arm coordination in young children for teaching proper writing habits is the practice of having the child trace known objects or written matter. The present invention relates to a tracing device which adds incentive and enjoyment for a child to enhance his desire to trace and thereby develop proper finger and arm coordination for writing purposes.

A principal object, therefore, of the present invention is to provide a new and improved tracing device.

Another object of the invention is to provide a tracing device which is designed to add incentive and enjoyment for a child in tracing.

As shown in application Ser. No. 853,269, filed Aug. 27, 1969, and entitled "Tracing Device." a structure is shown employing means simulating to live object such as a small animal which moves over and about a display screen to reproduce an image which is traced by manipulation of a tracing element which is mounted on a base structure for free movement to trace characters on a workpiece. The device is constructed to give the effect that the simulated live object moves independently of but in response to manipulation of the tracing element. The simulated live object is positioned on top of the display screen, and the object and image-forming means are provided with complementary magnetic members so that the object moves over and about the display screen in the same path followed by the image forming means movably mounted beneath the display screen.

In the present invention, a base structure is provided which has means for positioning a workpiece to be traced in a position facing the user. A tracing element is mounted on the base structure for free movement in the area of the workpiece-positioning means to permit easy manipulation to trace characters on the workpiece. A display area is defined on the base structure and includes a blank facing the user and on which an image is reproduced as characters on the workpiece are traced. The workpiece-positioning area is disposed on the base structure closer to the user to provide easy manipulation of the tracing element and the blank or display area is disposed further away from the user to provide easy visual observation of the blank while tracing. An image-forming means is connected by a parallelogram linkage to the tracing element to reproduce on the blank the characters on the workpiece as the tracing element is manipulated to trace the characters.

A further object of the present invention is to provide a tracing device as set forth in the preceding paragraph in which a doll is positioned adjacent the blank or display area with an arm of the doll positionable over the blank. The arm is journaled on the doll's body so that the end or hand portion of the arm is freely movable over the blank. The end of the doll's arm is connected to the image forming means so that they move as a unit over the blank to reproduce on the display screen the traced characters to give the effect that the doll is duplicating the characters traced by manipulation of the tracing element.

In the embodiment shown in the drawings, the body of the doll has relatively movable upper and lower body portions divided generally at the waist of the doll. The upper body portion of the doll moves relative to the lower body portion in response to movement of the doll's arm over the blank. In addition, the doll's head is connected to the upper portion of the doll's body for movement relative thereto and is connected by link means to the doll's arm so that the doll's head is caused to move relative to the doll's body in response to movement of the doll's arm over the blank. The doll has legs journaled to the lower portion of the doll's body and the base structure is generally hollow, with the display area or blank being positioned along one edge of the base structure and raised above a supporting surface on which the tracing device is positioned for use, at least the height of the thickness of the doll's legs. A side opening is provided in the base structure through which the doll's legs may extend into the hollow base support so that the doll faces the display area generally in a sitting position.

Other objects, features and advantages of the invention will become apparent from the following detailed description taken in connection with the accompanying drawings.

DESCRIPTION OF THE DRAWINGS

FIG. 2 is a vertical section taken generally along the line 2-2 of FIG. 1;

FIG. 3 is a top plan view, partially broken away to show the interior components of the device, and with a section through the doll's body;

FIG. 5 is an exploded view of the link means for moving the doll's head, with portions of certain of the link members being broken away to facilitate the illustration.

DETAILED DESCRIPTION OF THE INVENTION

Figure 1:
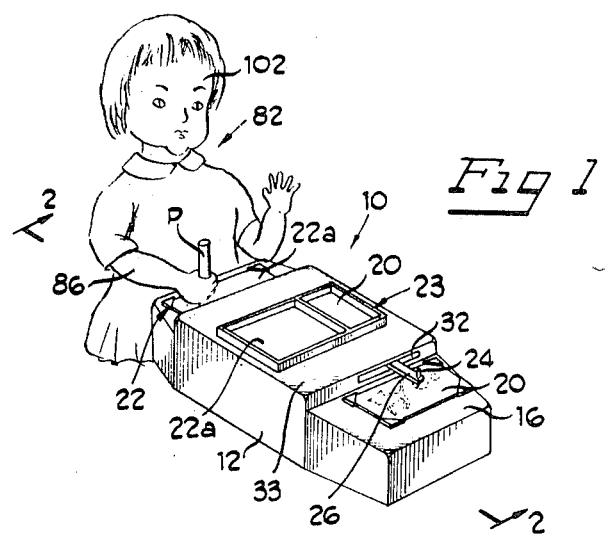
FIG. 1 is a perspective view of a tracing device embodying the concepts of the present invention.

Referring to the drawings in greater detail, the invention is shown herein as incorporated in a tracing device, generally designated 10, which comprises a generally rectangular, substantially hollow base structure 12 which has a generally flat bottom edge 14 (FIG. 2) for lying on a generally flat surface such as a desk top. The top wall 16 of the hollow base structure 12 has various defined areas. A sloped forward area, generally designated 18, is defined and is recessed for positioning a workpiece 20 to be traced by a user, such as a child, in a position to face upwardly toward the child as he sits at a desk or the like. The top wall 16 of the base structure 12 also defines a recessed rear display area, generally designated 22, for positioning a blank 22a, such as a piece of paper. A center storage area, generally designated 23 (FIG. 1) is provided with two compartments for additional workpieces and blanks.

A pointed tracing element 24 is connected to the outer end of a lever arm 26 which is part of a parallelogram linkage means, generally designated 28 (FIG. 3). The lever arm 26 extends through a generally horizontal elongated opening 32 below a raised portion 33 of the top wall 16 of the base structure 12, between the workpiece-positioning area 18 and the display area 22, whereby the tracing element 24 on the outer end of the lever arm 26 is easily grasped by a user to trace the workpiece 20 positioned in the recessed area 18.

Referring to FIGS. 2 and 3, the parallelogram type linkage means 28 is sandwiched between the raised portion 33 of the upper wall 16 and a lower plate 36 which is secured to bosses 38 extending downwardly from the raised upper wall portion 33. The linkage 28 has an extension link portion 40 extending over and above the blank area 22 for movement thereover in an identical scaled pattern as characters on the workpiece 20 are traced as the tracing element 24 is manipulated to trace characters on the workpiece. The end of the extension portion 40 has a recess or opening 42 on the outer end thereof for receiving and holding a pencil P (FIG. 1) or other marking means so as to reproduce an image of the traced characters on a blank 22a positioned in the display area 22. The parallelogram linkage means 28 is effective to transmit horizontal movement from the tracing element 24 to the extension link portion 40, and thus the image reproducing pencil held in the recess 42 at the end of link portion 40. The parallelogram structure includes a pair of elongate parallel link arms 44a and 44b pivotally connected at adjacent ends thereof to the lever arm 26 at points 46a and 46b, respectively, and pivotally connected at their opposite ends to the extension link portion 40 at points 48a and 48b, respectively. Link arm 44 b is pivotally connected to a boss 50 rigidly secured to the underside of the upper wall portion 33, as shown in FIG. 5. Thus, as the tracing element 24 on the end of lever arm 26 is manipulated over the workpiece 20, the entire parallelogram link structure 28 pivots about boss 50 and front to rear or sideways movement of the tracing element 24 is transmitted to move the recessed end of the extension link portion 40, and thereby move the pencil or other marking means received in the recess 42. To provide stability for the parallelogram linkage, a boss 52 is provided on the underside of the extension link 40 at the end thereof opposite the recessed end 42. This boss rides along the top surface of the plate 36. A second boss 54 is provided on top of the lever arm 26 about pivot point 46a for link arm 44a and this boss rides along the undersurface of the top wall portion 33.

Referring to FIG. 2, it can be seen that in operation, the tracing element 24 must be depressed into engagement with the workpiece 20 for tracing thereof. Thus, means are provided for transmitting this depressing or lowering motion to the end of the extension link 40 to provide pressure on the pencil or other marking means which is moved over the blank 22a in the display area 22. This means comprises a pair of generally U-shaped rodlike members, generally designated 56 and 58. Member 56 has laterally extending portions 60 pivotally journaled in support bosses 62. Lever arm 26, with the tracing element 24 on the end thereof rides along a cross portion 64 of the U-shaped member 56 and when the tracing element 24 is depressed into engagement with the workpiece, the rodlike member 56 is caused to pivot downwardly by engagement of the lever arm 26 with the top of the cross portion 64 of member 56. This downwardly depressing motion is transmitted to the rodlike member 58 through offset portions 66 of the member 58, which offset portions are disposed beneath legs 68 of the member 56. Member 58 is similarly U-shaped, except for the offset portions 66, and has laterally extending portions 70 pivotally journaled in support bosses 72. A cross portion 74 of the U-shaped rodlike member 58 overlies the extension link portion 40 and, when the tracing element 24 is depressed into engagement with the workpiece 20, the cross portion 74 of member 58 forces the extension link 40 downwardly to cause the end of a pencil or other marking means to come into engagement with the blank 22a in the display area 22. As seen best in FIG. 3, a crosspiece 76 spans the outer end of the rodlike member 58 adjacent the cross portion 74 thereof and is disposed under the extension link 40 so as to sandwich the extension link 40 between the crosspiece 76 and the cross portion 74 of member 58. A pair of leaf springs 78 are provided to return the rodlike members 56 and 58 to the raised positions shown in FIG. 2 when the tracing element 24 is released. The lever arm 26 correspondingly is raised by the cross portion 64 of the rodlike member 56 and the link portion 40 is raised by the crosspiece 76. Thus, the rodlike members 56 and 58, the crosspiece 76, and the leaf spring 78, are effective to transmit vertical movement of the tracing element 24 to corresponding vertical movement of the end of the extension link 40.

As pointed out above, the positioning area 18 for the workpiece 20 is sloped downwardly and forwardly. This is done to compensate for the flexibility in the relatively long and thin lever arm 26. Thus, as the lever arm 26 is moved outwardly toward the forward edge of the workpiece, a greater moment arm is provided as a result of having to depress the tracing element 24 a greater distance and, thereby, a greater force is effected on the end of the extension link 40 to insure that sufficient pressure is provided on the pencil or other marking means to effect a traced image.

Figure 4:
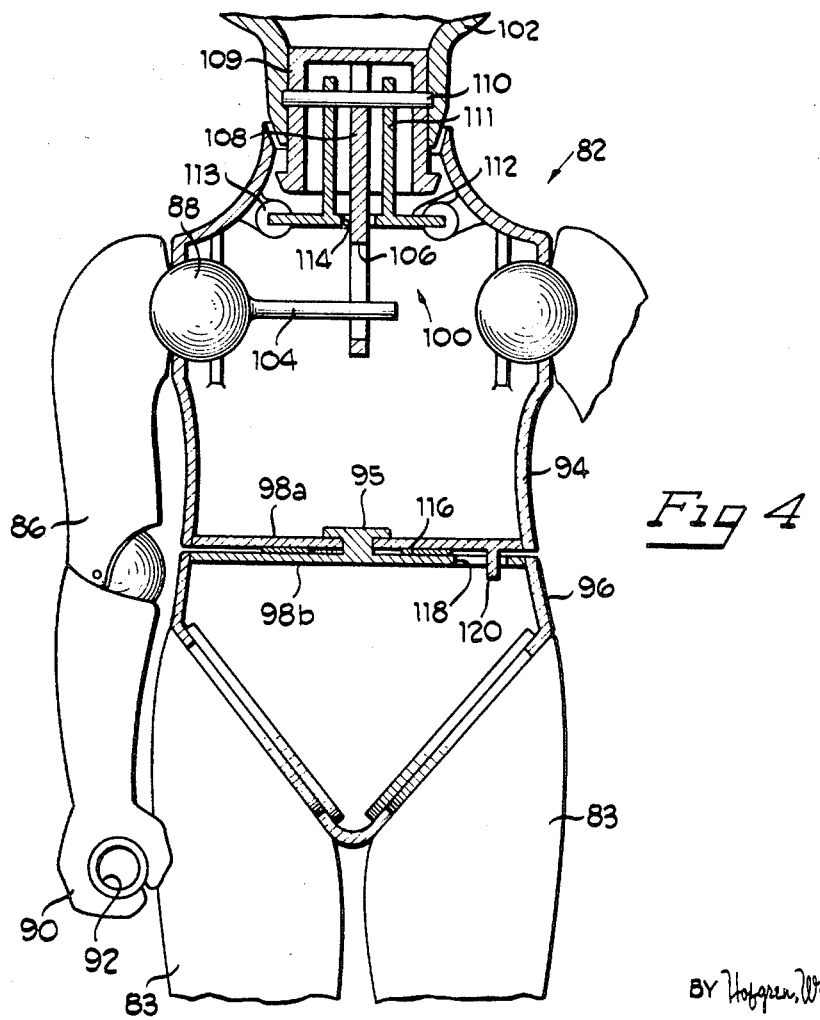
FIG. 4 is a partial vertical section through the body of the doll.

Referring to FIGS. 2 and 3, a doll-positioning member 80 is connected to the base structure 12 at the rear thereof and is provided for positioning a doll, generally designated 82, at the rear of the tracing device facing the blank or display area 22 in a generally sitting position. The doll has legs 83 journaled thereto, as shown in FIGS. 2 and 4, and the rear of the base structure 12 has an opening 84 through which the doll's legs may extend into the hollow base structure so that the doll faces the display area 22. The doll has a jointed arm 86 journaled to the doll's body by a ball joint 88 (FIG. 4), fixed to the arm, so that the end or hand portion 90 of the arm is freely movable over the display area 22. The doll's hand has a bore 92 therethrough for receiving a pencil or other marking means which is held by the recess 42 on the end of the extension link 40. Thus, as the tracing element 24 is manipulated over the workpiece 20 and the marking means or pencil is moved over the blank 22a to reproduce on the blank the characters on the workpiece 20, the doll's arm correspondingly moves with the marking means to give the effect that the doll is duplicating the character traced by manipulation of the tracing element 24.

The doll 82 has relatively movable upper and lower body portions 94 and 96 (FIGS. 2 and 4), respectively, divided generally at the waist of the doll by a pair of swivel plates 98a and 98b and held together by a latch means 95. Thus, as the doll's arm is moved over the blank 22a, the upper body portion 94 of the doll moves therewith and swivels relative to the lower body portion 96 which is held relatively stationary relative to the base structure 12 by the positioning member 80.

In addition, link means, generally designated 100 (FIGS. 2, 4, and 5) is provided between the ball joint 88 for the doll's arm 86 and the head 102 of the doll which is mounted for relative rotation on the top of the upper body portion 94. This link means includes a rod 104 rigidly fixed to and extending inwardly from the ball joint 88. The rod 104 extends into a vertically elongated slot 106 in a link member 108 which has a cylindrical portion 109 over which the neck of the doll's head is telescoped by a friction fit to permit twisting the doll's head without breakage. A pivot pin 110 for the link member 108 and, thus, the doll's head 102, extends through the link member 108 generally parallel to the rod 104 which extends inwardly from the ball joint 88. The pivot pin 110 is journaled in a pair of upstanding arm portions 111 (FIGS. 4 and 5) of a framepiece 112 so that the doll's head is limited to movement forwardly and rearwardly in a nodding fashion. The framepiece 112 is held in a pair of elongated slotted bosses 113 on the inside of the upper body portion 94 of the doll, as seen best in FIG. 5. More particularly, as the rod 104 moves in the direction of arrows A (FIG 2) as a result of movement of the doll's arm and the swiveling of the ball joint 88, the link member 108 will move therewith within an elongated slot 114 (FIG. 5) in the frame member 112 and pivot about pivot pin 110 and thereby cause the doll's head 102 to pivot therewith, since the doll's head is telescoped over the top of the link member 108.

Limit means are provided to insure that all of the motion of the doll's arm is not transmitted solely to effect swiveling movement of the upper body portion 94 of the doll, rather than transmitting at least some of the motion to the link means 100 to also move the doll's head. This means comprises two features. First, a friction pad 116 is provided between the swivel plates 98a and 98b between the upper and lower body portions 94 and 96, respectively, to provide initial resistance to cause the head of the doll to move somewhat. In addition, an aperture 118 (FIG. 3) is provided in the lower swivel plate 98b at the doll's waist for receiving a downwardly projecting boss 120 on the upper swivel plate 98a. The confines of the aperture 118 limits the movement of the projecting boss 120 within the aperture 118 relative to the fixed lower waist plate 98a. Once the projecting boss 120 comes into engagement with one of the edges of the aperture 118, the movement of the doll's arm, through the ball joint 88, is forced to be transmitted to the head-swiveling link means 100, through the rod 104.

The foregoing detailed description has been given for clearness of understanding only and no unnecessary limitations should be understood therefrom as some modifications will be obvious to those skilled in the art.

We claim:
1. In a tracing device which includes a base structure, means on the base structure for positioning a workpiece to be traced, a tracing element mounted on the base structure for free movement in the area of the workpiece-positioning means to permit easy manipulation to trace characters on a positioned workpiece, means on the base structure defining a blank or display position facing the user, link means connected to said tracing element and including an extension portion extending over and above said blank and movable over the blank in an identically scaled pattern as said tracing element as the tracing element is manipulated to trace said characters, the improvement comprising a doll positioned adjacent said blank with an arm of the doll positionable over the blank, the arm being journaled on the doll's body so that the end or hand portion of the arm is freely movable over the blank, marking means for forming images on the blank, and means connecting the end of the doll's arm, said extension portion of said link means, and said marking means so that they move as a unit over the blank to reproduce said characters on the blank to give the effect that the doll is duplicating the characters traced by manipulation of the tracing element.

2. The tracing element of claim 1 wherein the body of said doll has relatively movable upper and lower portions divided generally at the waist of the doll, whereby movement of the end of the doll's arm over said blank causes relative movement between said body portions.

3. The tracing element of claim 2 wherein said doll has a head connected to said upper body portion for movement relative thereto, and including link means between the doll's arm and the doll's head to cause relative movement therebetween in response to movement of the end of the doll's arm over said blank.

4. The tracing element of claim 3 including means to insure that both the head moves relative to the upper body portion and the body portions move relative to each other as the end of the doll's arm is moved over said blank.

5. The tracing element of claim 2 wherein said doll is positioned adjacent said blank generally in a sitting position, and including means connected to said base structure to hold the lower portion of the doll's body relatively stationary relative to the base structure, whereby the upper portion of the doll's body moves relative to the lower portion in response to movement of the end of the doll's arm over said blank.

6. The tracing element of claim 5 wherein said doll has a head connected to said upper body portion for movement relative thereto, and including link means between the doll's arm and the doll's head to cause relative movement between the head and the upper body portion in response to movement of the end of the doll's arm over said blank.

7. The tracing element of claim 5 wherein said doll has legs journaled to said lower body portion, said base structure being generally hollow and said blank being positioned along one edge of said base structure and raised above a supporting surface at least the height of the thickness of the doll's legs, and including a side opening in said base structure through which the doll's legs may extend into the hollow base support so that the doll faces the blank.

8. The tracing element of claim 1 wherein said doll has a head connected to the doll's body for movement relative thereto, and including link means between the doll's arm and the doll's head to cause relative movement therebetween in response to movement of the end of the doll's arm over said blank.

9. The tracing element of claim 1 wherein said doll has legs journaled to the doll's body, said base structure being generally hollow and said blank being positioned along one edge of said base structure and raised above a supporting surface at least the height of the thickness of the doll's legs, and including a side opening in said base structure through which the doll's legs may extend into the hollow base support so that the doll faces the blank.

10. Apparatus for duplicating at a remote station a configuration outlined by an operator at an input station, including in combination, a support providing an input station surface and an output surface at said remote station, a stylus, means mounting said stylus for movement over said input surface, a toy figure having a torso and an arm movable with respect to said torso and having a hand on said arm positioned for movement over said output surface, a writing implement carried by said hand, and motion-reproducing means connecting said stylus and said writing implement to cause said hand and said implement to reproduce the motion of said stylus in response to manipulation thereof by an operator.

11. Apparatus as in claim 10 including means normally biasing said stylus and said implement out of engagement with the surfaces with which they are associated.

12. Apparatus as in claim 10 in which said motion reproducing means comprises means for transmitting downward pressure on said stylus to said implement.

13. Apparatus as in claim 10 in which said motion reproducing means comprises a parallel motion linkage, one of the links of said linkage having an extension for receiving said implement, said stylus mounting means comprising an extension on another link of said linkage.

14. Apparatus as in claim 10 in which said motion reproducing means comprises a parallel motion linkage, said stylus mounting means comprising an extension on one link of said linkage, another link of said linkage having an extension at one end thereof for receiving said implement and having means at the other end thereof providing a fulcrum for ensuring transmission of downward pressure on said stylus to said implement.

15. Apparatus as in claim 10 in which said toy figure comprises a head mounted for movement on said torso and means responsive to movement of said arm for moving said head.